United States Patent
Jaker

(10) Patent No.: US 7,432,328 B2
(45) Date of Patent: Oct. 7, 2008

(54) ENHANCED ESCR BIMODAL HDPE FOR BLOW MOLDING APPLICATIONS

(75) Inventor: Stephen Jaker, Woodbridge, NJ (US)

(73) Assignee: Univation Technologies, LLC, Houston, TX (US)

( * ) Notice: Subject to any disclaimer, the term of this patent is extended or adjusted under 35 U.S.C. 154(b) by 412 days.

(21) Appl. No.: 11/152,536

(22) Filed: Jun. 14, 2005

(65) Prior Publication Data

US 2006/0281867 A1 Dec. 14, 2006

(51) Int. Cl.
*C08L 23/00* (2006.01)
*C08L 23/04* (2006.01)

(52) U.S. Cl. ....................... 525/191; 525/240

(58) Field of Classification Search ................. 525/191, 525/240
See application file for complete search history.

(56) References Cited

U.S. PATENT DOCUMENTS

| | | | |
|---|---|---|---|
| 4,461,873 A * | 7/1984 | Bailey et al. ................. | 525/240 |
| 4,547,551 A | 10/1985 | Bailey et al. ................. | 525/240 |
| 4,960,741 A | 10/1990 | Bailly et al. ................. | 502/10 |
| 5,260,384 A | 11/1993 | Morimoto et al. ............ | 525/240 |
| 5,288,933 A | 2/1994 | Kao et al. .................... | 585/513 |
| 5,352,749 A | 10/1994 | DeChellis et al. ............ | 526/68 |
| 5,525,678 A | 6/1996 | Mink et al. .................. | 525/246 |
| 5,677,375 A | 10/1997 | Rifi et al. ..................... | 525/53 |
| 5,889,128 A | 3/1999 | Schrock et al. .............. | 526/107 |
| 5,908,679 A | 6/1999 | Berthold et al. ............. | 428/36.9 |
| 6,201,078 B1 | 3/2001 | Breulet et al. ............... | 526/113 |
| 6,242,543 B1 | 6/2001 | Follestad et al. ............ | 526/118 |
| 6,271,325 B1 | 8/2001 | McConville et al. ........ | 526/107 |
| 6,472,484 B1 | 10/2002 | Abe et al. .................... | 526/201 |
| 6,545,093 B1 | 4/2003 | de Lange et al. ............ | 525/191 |
| 6,562,905 B1 | 5/2003 | Nummila-Pakarinen et al. ........... | 525/191 |
| 6,579,922 B2 | 6/2003 | Laurent ....................... | 524/240 |
| 6,605,675 B2 | 8/2003 | Mawson et al. ............. | 526/115 |
| 6,608,149 B2 | 8/2003 | Mawson et al. ............. | 526/60 |
| 6,642,313 B1 | 11/2003 | Kazakov et al. ............. | 525/191 |
| 2004/0048736 A1 | 3/2004 | Mink et al. .................. | 502/102 |

FOREIGN PATENT DOCUMENTS

| | | |
|---|---|---|
| EP | 0 517 868 | 7/1994 |
| EP | 739937 | 10/1996 |
| WO | WO 99/01460 | 1/1999 |

OTHER PUBLICATIONS

Davey, Chris, R., et al., "Engineered Catalyst For Controlled Bimodal Structures in UNIPOL Single Reactor Gas Phase Polyethylene," SPE-Polyolefins 2002 International Conference Feb. 25-27, 2002.
Scheirs, John, et al., "PE100 Resins for Pipe Applications: Continuing the Development into the 21st Century" TRIP vol. 4, No. 12, 408-415 (1996).
Berthold, J. et al. "Advanced Polymerisation process for tailor made pipe resins" Plast., Rubber Compos. Process. Appl., pp. 368-372 (1996).
Ebner, K., "Bi-Modal HDPE for Piping Systems and Further Applications" Adv. Plast. Technol. Apt '97, Int. Conf., pp. 1-8 (1997).
Zabusky, H.H., et al. "Properties of High Density Polyethylene with Bimodal Molecular Weight Distribution" SPE Transactions, pp. 17-21 (1964).
Böhm, L.L. et al., "The Industrial Synthesis of Bimodal Polyethylene Grades with Improved Properties" Studies in Surface Science and Catalysis, Catalyst Design for Tailor-Made Polyolefinsm pp. 351-363 (1994).
"Designation: D 1693-01; Standard Test Method for Environmental Stress-Cracking of Ethylene Plastics," *ASTM International*, pp. 1-12 (PA).

* cited by examiner

*Primary Examiner*—Nathan M Nutter
(74) *Attorney, Agent, or Firm*—Kevin M. Faulkner; Leandro Arechederra

(57) ABSTRACT

Bimodal polyethylene compositions and blow molded bottles made therefrom are provided. In at least one specific embodiment, the composition includes at least one high molecular weight polyethylene component having a molecular weight distribution (MWD) of about 6 to about 9, a short chain branch content of less than about 2 branches per 1,000 main chain carbons, and a Mz of about 1,100,000 or more. The composition also includes at least one low molecular weight polyethylene component where a ratio of weight average molecular weight of the high molecular weight polyethylene component to weight average molecular weight of the low molecular weight polyethylene component is about 20 or less. The composition has a density of about 0.94 g/cc or more, an ESCR of about 600 hours or more, and a percent die swell of about 70% or more.

18 Claims, No Drawings

ENHANCED ESCR BIMODAL HDPE FOR BLOW MOLDING APPLICATIONS

BACKGROUND OF THE INVENTION

1. Field of the Invention

Embodiments of the present invention generally relate to compositions containing polyethylene, particularly high density polyethylene compositions, which are preferably bimodal polyethylene compositions.

2. Description of the Related Art

Ongoing efforts have been directed to making blow molding compositions, particularly for bottles. The goal is for the composition to be made economically and efficiently, but also to provide a composition with the right balance of properties, e.g., strength, stiffness, as well as good processability.

Higher density polyethylene blow molding compositions typically show poor environmental stress crack resistance (ESCR). ESCR is a measure of mechanical failure. Consequently, higher density polyethylene compositions have not been used for blow molding applications, especially for bottles where a high resistance to cracking, i.e. high ESCR, is desired or required. However, higher density compositions are preferred to obtain the desired mechanical properties such as bottle rigidity.

There is a need, therefore, for higher density polyethylene compositions that exhibit good ESCR as well as good mechanical strength properties suitable for blow molding applications, including bottles.

SUMMARY OF THE INVENTION

Bimodal polyethylene compositions and blow molded bottle made therefrom are provided. In at least one specific embodiment, the composition includes at least one high molecular weight polyethylene component having a molecular weight distribution (MWD) of about 6 to about 9, a short chain branch content of less than about 2 branches per 1,000 main chain carbons, and a Mz of about 1,100,000 or more. The composition also includes at least one low molecular weight polyethylene component where a ratio of weight average molecular weight of the high molecular weight polyethylene component to weight average molecular weight of the low molecular weight polyethylene component is about 20 or less. The composition has a density of about 0.94 g/cc or more, an ESCR of about 600 hours or more, and a percent die swell of about 70% or more.

In at least one other specific embodiment, the bimodal polyethylene includes at least one high molecular weight polyethylene component having a molecular weight distribution (MWD) of about 6 to about 9, a Mz of about 1,100,000 or more, and a Mz+1 of about 2,000,000 or more; and at least one low molecular weight polyethylene component having a molecular weight of about 50,000 or less. The composition has a density of about 0.94 g/cc or more, an ESCR of about 600 hours or more, and a percent die swell of about 70% or more.

An extruded bottle from the bimodal polyethylene composition is also provided. In at least one specific embodiment, the bottle includes a bimodal polyethylene composition having at least one high molecular weight polyethylene component having a molecular weight distribution (MWD) of about 6 to about 9 and a short chain branch content of less than about 2 branches per 1,000 main chain carbons. The bimodal polyethylene composition also includes at least one low molecular weight component. The high molecular weight polyethylene component is present in an amount of about 50 wt % or less of the composition. The composition has a density of about 0.94 g/cc or more; an ESCR of about 600 hours or more; and a percent die swell of about 70% or more. The bottle is blow molded to have a wall thickness of about 0.01 inches to about 0.03 inches and a weight of at least 70 grams.

DETAILED DESCRIPTION

Bimodal, high density polyethylene (HDPE) compositions having a surprising combination of excellent die swell and environmental stress crack resistance (ESCR) are provided. The bimodal polyethylene compositions are capable of producing blow molded bottles having an average wall thickness between about 0.01 inches and about 0.03 inches with a weight of about 70 grams or more, ESCR of about 600 hours or more, and die swell of about 70% or more.

The bimodal polyethylene compositions can include at least one high molecular weight polyethylene component (HMWC) and at least one low molecular weight polyethylene component (LMWC). It is believed that the broader MWD and comonomer response of the HMWC provides a bimodal polyethylene composition capable of producing a bimodal blow molding product with enhanced ESCR and commercially preferred die swell. Preferably, the die swell is great than about 70%, and more preferably greater than 75%.

The term "bimodal" refers to a polymer or polymer composition, e.g., polyethylene, having a "bimodal molecular weight distribution." The terms "bimodal" and "bimodal molecular weight distribution " are intended to have the broadest definition that persons in the pertinent art have given that term as reflected in one or more printed publications or issued patents, such as U.S. Pat. No. 6,579,922, for example. A "bimodal" composition can include a polyethylene component with at least one identifiable higher molecular weight and a polyethylene component with at least one identifiable lower molecular weight, e.g., two distinct peaks on an SEC curve. A material with more than two different molecular weight distribution peaks will be considered "bimodal" as that term is used although the material may also be referred to as a "multimodal" composition, e.g., a trimodal or even tetramodal, etc. composition.

The term "polyethylene" means a polymer made of at least 50% ethylene-derived units, preferably at least 70% ethylene-derived units, more preferably at least 80% ethylene-derived units, or 90% ethylene-derived units, or 95% ethylene-derived units, or even 100% ethylene-derived units. The polyethylene can thus be a homopolymer or a copolymer, including a terpolymer, having other monomeric units. A polyethylene described herein can, for example, include at least one or more other olefin(s) and/or comonomer(s). The olefins, for example, can contain from 3 to 16 carbon atoms in one embodiment; from 3 to 12 carbon atoms in another embodiment; from 4 to 10 carbon atoms in another embodiment; and from 4 to 8 carbon atoms in yet another embodiment. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. Other embodiments may include ethacrylate or methacrylate.

The term "high molecular weight polyethylene component" refers to the polyethylene component in the bimodal composition that has a higher molecular weight than the molecular weight of at least one other polyethylene component in the same composition. Preferably, that polyethylene component has an identifiable peak. When the composition includes more than two components, e.g., a trimodal composition, then the high molecular weight component is to be defined as the component with the highest weight average molecular weight.

In one or more embodiments, a high molecular weight component is a component forming a part of the bimodal composition that has a weight average molecular weight (Mw) from 300,000 to 800,000. In one or more embodiments, the weight average molecular weight of the high molecular weight polyethylene component may range from a low of about 200,000, or 250,000, or 300,000, or 350,000, or 375,000 to a high of 400,000, or 500,000, or 600,000, or 700,000 or 800,000.

The term "low molecular weight polyethylene component" refers to the polyethylene component in the composition that has a lower molecular weight than the molecular weight of at least one other polyethylene component in the same composition. Preferably, that polyethylene component has an identifiable peak. When the composition includes more than two components, e.g., a trimodal composition, then the low molecular weight component is to be defined as the component with the lowest weight average molecular weight.

In certain embodiments, a low molecular weight component is a component forming a part of the composition that has a weight average molecular weight (Mw) from 5,000 to 45,000. In different specific embodiments, the weight average molecular weight of the low molecular weight component can range from a low of about 3,000, or 5,000, or 8,000, or 10,000, or 12,000, or 15,000, to a high of about 100,000, or 80,000, or 70,000, or 60,000, or 50,000 or 45,000.

The number average (Mn), weight average (Mw), z-average (Mz), and Z+1 average (Mz+1) molecular weight are terms that refer to the molecular weight values for the entire composition (e.g. the blended composition), as opposed to that of any individual component, unless specifically noted otherwise. The number average, weight average, z-average, and z+1 average molecular weight values encompass any value as determined by any published method. For example, the weight average molecular weight (Mw) can be measured measured or calculated according to the procedure described in ASTM D 3536-91 (1991) and ASTM D 5296-92 (1992).

The number average, weight average, z-average and z+1 average molecular weight of a particular polyethylene component, e.g., the high molecular weight polyethylene component and the low molecular weight polyethylene component, can be determined by any published method. A preferred method uses any published deconvolution procedure, e.g., any published technique for elucidating each individual polymer component's molecular information in a bimodal polymer. A particularly preferred technique uses a Flory deconvolution, including but not limited to the Flory procedures set forth in U.S. Pat. No. 6,534,604 which is incorporated by reference in its entirety. Any program that incorporates the principles contained in the following reference is useful: P. J. Flory, Principles of Polymer Chemistry, Cornell University Press, New York 1953. Any computer program capable of fitting an experimental molecular weight distribution with multiple Flory or log-normal statistical distributions is useful. The Flory distribution can be expressed as follows:

$$Y = A_o \left(\frac{M}{M_n}\right)^2 e^{\left(-\frac{M}{M_n}\right)}$$

In this equation, Y is the weight fraction of polymer corresponding to the molecular species M, Mn is the number average molecular weight of the distribution, and $A_o$ is the weight fraction of the site generating the distribution. Y can be shown to be proportional to the differential molecular weight distribution (DMWD) which is the change in concentration with the change in log-molecular weight. The SEC chromatogram represents the DMWD. Any computer program that minimizes the square of the difference between the experimental and calculated distributions by varying the $A_o$ and Mn for each Flory distribution is preferred. Particularly preferred is any program that can handle up to 8 Flory distributions. A commercially available program, called Excel Solver, offered by Frontline Systems, Inc. at www.solver.com can be used to perform the minimization. Using this program, special constraints can be placed on the individual Flory distributions that allow one to fit chromatograms of experimental blends and bimodal distributions.

Bimodal distributions can be fit within two individual groups of four constrained Flory distributions, for a total of eight distributions. One constrained group of four fits the low molecular weight component while the other group fits the high molecular weight component. Each constrained group is characterized by $A_o$ and Mn of the lowest molecular weight component in the group and the ratios $A_o(n)/A_o(1)$ and $Mn(n)/Mn(1)$ for each of the other three distributions (n=2, 3, 4). Although the total number of degrees of freedom is the same for the constrained fit as for eight unconstrained Flory distributions, the presence of the constraint is needed to more accurately determine the contribution to the total chromatogram of the individual low molecular weight and high molecular weight components in a bimodal polymer. Once the fitting process is complete, the program will then calculate the molecular weight statistics and weight percents of the individual high and low molecular weight components.

The term "MWD" (molecular weight distribution) means the same thing as "PDI" (polydispersity index). The term "MWD" (PDI) is intended to have the broadest definition that persons in the pertinent art have given that term as reflected in one or more printed publications or issued patents. The MWD (PDI) is the ratio of weight-average molecular weight (Mw) to number-average molecular weight (Mn), i.e., Mw/Mn.

Preferably, the at least one high molecular weight polyethylene component (HMWC) has a MWD ranging from a low of about 6.0 to a high of about 9.0. In one or more embodiments, the HMWC has a MWD of about 6.5 to about 8.5. In one or more embodiments, the HMWC has a MWD of about 6.5 to about 8.0. Preferably, the HMWC has a MWD of about 6.6 to about 8.2.

In one or more embodiments, the LMWC has a MWD ranging from a low of about 3.0 to about 5.0. In one or more embodiments, the LMWC has a MWD of about 3.5 to about 4.5. In one or more embodiments, the LMWC has a MWD of about 3.7 to about 4.2. Preferably, the LMWC has a MWD of about 3.7 to about 4.0.

In one or more embodiments, the bimodal polyethylene composition has a MWD ranging from a low of about 9, 10, or 15 to a high of about 20, 25, or 30 In one or more embodiments, the bimodal polyethylene composition has a MWD of about 10 to about 22. In one or more embodiments, the bimodal polyethylene composition has a MWD of about 10 to about 20. Preferably, the bimodal polyethylene composition has a MWD of about 13 to about 18.

The comonomer response can be determined by the "short chain branch content." The term "short chain branch content" refers to the number of branches on the polymer having less than 8 carbons per 1,000 main chain carbon atoms, and is measured by carbon-13 NMR. In one or more embodiments, the HMWC has a short chain branch content of less than about 5 branches per 1,000 main chain carbons. In one or more embodiments, the HMWC has a short chain branch content of less than about 4 branches per 1,000 main chain carbons. In one or more embodiments, the HMWC has a short chain branch content of less than about 3 branches per 1,000 main chain carbons. In one or more embodiments, the HMWC has a short chain branch content of less than about 2 branches per 1,000 main chain carbons.

Preferably, the HMWC has a short chain branch content of about 0.01 branches per 1,000 carbon atoms in the polymer backbone to about 5.0. In one or more embodiments, the HMWC has a short chain branch content of about 0.5 branches per 1,000 carbon atoms in the polymer backbone to about 4.0. In one or more embodiments, the HMWC has a short chain branch content of about 1.0 branches per 1,000 carbon atoms in the polymer backbone to about 3.0. In one or more embodiments, the HMWC has a short chain branch content of about 1.5 branches per 1,000 carbon atoms in the polymer backbone to about 2. The LMWC can have less than about 0.1 branches per 1,000 carbon atoms.

Not wishing to be bound by theory, it is believed that the comonomer response of the HMWC provides a z-average molecular weight (Mz) and z+1 average molecular weight (Mz+1) that provides the surprising balance between mechanical strength, die swell and ESCR. Preferably, the HMWC has a z-average molecular weight (Mz) of about 1,100,000 Daltons or more. In one or more embodiments, the HMWC has a z-average molecular weight (Mz) of about 1,300,000 Daltons or more. In one or more embodiments, the HMWC has a z-average molecular weight (Mz) of about 1,400,000 Daltons or more. In one or more embodiments, the HMWC has a z-average molecular weight (Mz) between about 1,100,000 Daltons and about 2,000,000 Daltons. In one or more embodiments, the HMWC has a z-average molecular weight (Mz) between about 1,300,000 Daltons and about 1,900,000 Daltons. In one or more embodiments, the HMWC has a z-average molecular weight (Mz) that ranges between a low of about 1,100,000, or 1,200,000, or 1,300,000, or 1,400,000 Daltons to a high of about 1,600,000, or 1,700,000, or 1,800,000, or 1,900,000 Daltons.

In one or more embodiments, the HMWC has a z+1-average molecular weight (Mz+1) of about 2,000,000 Daltons or more. In one or more embodiments, the HMWC has a z+1-average molecular weight (Mz+1) of about 2,800,000 Daltons or more. In one or more embodiments, the HMWC has a z+1-average molecular weight (Mz+1) of about 3,400,000 Daltons or more. In one or more embodiments, the HMWC has a z+1-average molecular weight (Mz+1) between about 2,000,000 Daltons and about 3,500,000 Daltons. In one or more embodiments, the HMWC has a z+1-average molecular weight (Mz+1) between about 2,700,000 Daltons and about 3,500,000 Daltons. In one or more embodiments, the HMWC has a z+1-average molecular weight (Mz+1) that ranges between a low of about 2,000,000, or 2,500,000, or 3,000,000 Daltons to a high of about 3,300,000, or 3,400,000, or 3,500,000 Daltons.

The term "spread" refers to the ratio of the weight average molecular weight of the high molecular weight component, sometimes referred to as $MW_{HMW}$, to the weight average molecular weight of the low molecular weight component, sometimes referred to as $MW_{LMW}$. The "spread" can therefore also be expressed as the ratio of $MW_{HMW}:MW_{LMW}$. The weight average molecular weight of each component can be obtained by deconvolution of an overall SEC curve, i.e., an SEC curve of an entire composition as discussed above.

In one or more embodiments, the bimodal polyethylene composition has a spread of less than about 20, preferably less than about 15 or 14 or 13 or 12 or 11 or 10. In one or more embodiments, the spread of the bimodal polyethylene composition ranges from a low of about 5 or 6 or 7 to a high of about 13 or 14 or 15. In one or more embodiments, the spread of the bimodal polyethylene composition ranges from a low of about 12 to a high of about 15.

The term "split" refers to the weight percent (%) of the high molecular weight polyethylene component in the bimodal composition. Thus, it describes the relative amount of the high polyethylene molecular weight component against the low molecular weight polyethylene component in a bimodal polyethylene composition, including any of the polymer compositions described herein. The weight % of each component can also be represented by the area of each molecular weight distribution curve that is seen after deconvolution of the overall molecular weight distribution curve.

In one or more embodiments, the split of the bimodal polyethylene composition ranges from a low of about 30% or 35% or 40% to a high of about 50% or 55% or 60%. In one or more embodiments, the split of the bimodal polyethylene composition is about 40% to about 60%. In one or more embodiments, the split of the bimodal polyethylene composition is about 45% to about 55%.

Density is a physical property of a composition and is determined in accordance with ASTM-D-1505. Density can be expressed as grams per cubic centimeter (g/cc) unless otherwise noted. Except to the extent the actual density is specified, the term "high density" means any density of 0.940 g/cc or above, alternatively 0.945 g/cc or above, alternatively 0.950 g/cc or above, and alternatively still 0.960 g/cc or above. An illustrative range of a high density composition is from 0.945 g/cc to 0.967 g/cc.

In one or more embodiments, the HMWC has a density ranging from a low of 0.920 g/gmol, 0.925 g/gmol, or 0.930 g/gmol to a high of 0.935 g/gmol, 0.940 g/gmol, or 0.945 g/gmol. In one or more embodiments, the HMWC has a density of 0.930 g/gmol to 0.936 g/gmol. In one or more embodiments, the HMWC has a density of 0.932 g/gmol to 0.940 g/gmol. Preferably, the HMWC has a density of 0.932 g/gmol to 0.936 g/gmol.

In one or more embodiments, the LMWC has a density ranging from a low of 0.950 g/gmol, 0.955 g/gmol, or 0.960 g/gmol to a high of 0.970 g/gmol, 0.980 g/gmol, or 0.980 g/gmol. In one or more embodiments, the LMWC has a density of 0.960 g/gmol to 0.975 g/gmol. In one or more embodiments, the HMWC has a density of 0.965 g/gmol to 0.975 g/gmol. Preferably, the LMWC has a density of 0.965 g/gmol to 0.970 g/gmol.

In one or more embodiments, the bimodal polyethylene composition has a density ranging from a low of 0.920 g/gmol, 0.930 g/gmol, or 0.940 g/gmol to a high of 0.950 g/gmol, 0.960 g/gmol, or 0.970 g/gmol. In one or more embodiments, the bimodal polyethylene composition has a density of 0.945 g/gmol to 0.965 g/gmol. In one or more embodiments, the bimodal polyethylene composition has a density of 0.948 g/gmol to 0.960 g/gmol. Preferably, the bimodal polyethylene composition has a density of 0.948 g/gmol to 0.958 g/gmol.

The term "MFR ($I_{21}/I_2$)" as used herein means the ratio of $I_{21}$ (also referred to as flow index or "FI") to $I_2$ (also referred to as melt index or "MI"). Both FI ($I_{21}$) and MI ($I_2$) are measured in accordance with ASTM-1238, Condition E, at 190° C.

In one or more embodiments, the LMWC has a MFR ranging from a low of about 10, 15, or 20 to a high of about 30, 40, or 50. In one or more embodiments, the LMWC has a MFR of about 10 to about 35 In one or more embodiments, the LMWC has a MFR of about 15 to about 25. Preferably, the LMWC has a MFR of about 16 to about 23.

In one or more embodiments, the bimodal polyethylene composition has a MFR ranging from a low of about 50, 60, or 70 to a high of about 100, 120 or 150. In one or more embodiments, the bimodal polyethylene composition has a MFR from about 50 to about 135. In one or more embodiments, the bimodal polyethylene composition has a MFR from about 60 to about 120. Preferably, the bimodal polyethylene composition has a MFR of about 67 to about 119.

In one or more embodiments, the HMWC has a FI ranging from a low of about 0.1 g/10 min, 0.2 g/10 min, or 0.3 g/10 min to a high of about 1.0 g/10 min, 2.0 g/10 min, or 3.0 g/10 min. In one or more embodiments, the HMWC has a FI of about 0.35 g/10 min to about 2.0 g/10 min. In one or more embodiments, the HMWC has a FI of about 0.35 g/10 min to about 1.5 g/10 min. Preferably, the HMWC has a FI of about 0.36 g/10 min to about 1.2 g/10 min.

In one or more embodiments, the LMWC has a FI ranging from a low of about 800 g/10 min, 900 g/10 min, or 1,000 g/10 min to a high of about 1,500 g/10 min, 2,000 g/10 min, or 4,000 g/10 min. In one or more embodiments, the LMWC has a FI of about 800 g/10 min to about 3,800 g/10 min. In one or more embodiments, the LMWC has a FI of about 900 g/10 min to about 3,725 g/10 min. Preferably, the LMWC has a FI of about 925 g/10 min to about 3,725 g/10 min.

In one or more embodiments, the bimodal polyethylene composition has a FI of at least about 5 g/10 min. In one or more embodiments, the bimodal polyethylene composition has a FI less than about 40 g/10 min. In one or more embodiments, the bimodal polyethylene composition has a FI ranging from a low of about 5 g/10 min, 15 g/10 min or 30 g/10 min to a high of about 40 g/10 min, 50 g/10 min, or 60 g/10 min. Preferably, the bimodal polyethylene composition has a FI of about 5 g/10 min to about 40 g/10 min.

In one or more embodiments, the LMWC has a MI ranging from a low of about 40 g/10 min, 50 g/10 min, or 60 g/10 min to a high of about 150 g/10 min, 170 g/10 min, or 200 g/10 min. In one or more embodiments, the LMWC has a MI of about 40 g/10 min to about 185 g/10 min. In one or more embodiments, the LMWC has a MI of about 55 g/10 min to about 185 g/10 min. Preferably, the LMWC has a MI of about 55 g/10 min to about 100 g/10 min.

In one or more embodiments, the bimodal polyethylene composition has a MI ranging from a low of about 0.01 g/10 min, 0.03 g/10 min, or 0.05 g/10 min to a high of about 1.0 g/10 min, 1.5 g/10 min, or 2.0 g/10 min. In one or more embodiments, the bimodal polyethylene composition has a MI from about 0.05 g/10 min to about 1.2 g/10 min. In one or more embodiments, the bimodal polyethylene composition has a MI of about 0.07 g/10 min to about 1.2 g/10 min. Preferably, the bimodal polyethylene composition has a MI of about 0.07 g/10 min to about 1.0 g/10 min.

SPECIFIC EMBODIMENTS

Certain specific embodiments of those compositions described are discussed in further detail below.

In at least one specific embodiment, a bimodal high density polyethylene composition includes at least one high molecular weight polyethylene component having a molecular weight distribution (MWD) of about 6 to about 9, a short chain branch content of less than about 2 branches per 1,000 main chain carbons, and a Mz of about 1,100,000 or more. The composition also includes at least one low molecular weight polyethylene component where a ratio of weight average molecular weight of the high molecular weight polyethylene component to weight average molecular weight of the low molecular weight polyethylene component is about 20 or less. The composition has a density of about 0.94 g/cc or more, an ESCR of about 600 hours or more, and a percent die swell of about 70% or more.

In at least one other specific embodiment, the bimodal polyethylene includes at least one high molecular weight polyethylene component having a molecular weight distribution (MWD) of about 6 to about 9, a Mz of about 1,100,000 or more, and a Mz+1 of about 2,000,000 or more; and at least one low molecular weight polyethylene component having a molecular weight of about 50,000 or less. The composition has a density of about 0.94 g/cc or more, an ESCR of about 600 hours or more, and a percent die swell of about 70% or more.

In one or more embodiments above or elsewhere herein, the high molecular weight polyethylene component has a Mz+1 of about 2,000,000 or more.

In one or more embodiments above or elsewhere herein, the high molecular weight polyethylene component has a comonomer content of about 0.3 mol % to about 1 mol %.

In one or more embodiments above or elsewhere herein, the composition has a density of about 0.96 g/cc or more.

In one or more embodiments above or elsewhere herein, the high molecular weight polyethylene component is present in an amount of about 60 wt % or less of the composition.

In one or more embodiments above or elsewhere herein, the high molecular weight polyethylene component is present in an amount of about 50 wt % or less of the composition.

In one or more embodiments above or elsewhere herein, the high molecular weight polyethylene component is present in an amount of about 40 wt % or less of the composition.

In one or more embodiments above or elsewhere herein, the ratio of weight average molecular weight of the high molecular weight polyethylene component to weight average molecular weight of the low molecular weight polyethylene component is about 15 or less. In one or more embodiments above or elsewhere herein, the ratio of weight average molecular weight of the high molecular weight polyethylene component to weight average molecular weight of the low molecular weight polyethylene component is about 14 or less. In one or more embodiments above or elsewhere herein, the ratio of weight average molecular weight of the high molecular weight polyethylene component to weight average molecular weight of the low molecular weight polyethylene component is about 13 or less. In one or more embodiments above or elsewhere herein, the ratio of weight average molecular weight of the high molecular weight polyethylene component to weight average molecular weight of the low molecular weight polyethylene component is about 12 or less. In one or more embodiments above or elsewhere herein, the ratio of weight average molecular weight of the high molecular weight polyethylene component to weight average molecular weight of the low molecular weight polyethylene component is about 11 or less. In one or more embodiments above or elsewhere herein, a ratio of weight average molecular weight of the high molecular weight polyethylene component to weight average molecular weight of the low molecular weight polyethylene component is about 10 or less.

In one or more embodiments above or elsewhere herein, the high molecular weight polyethylene component has a short chain branch content of less than about 2 branches per 1,000 main chain carbons. In one or more embodiments above or elsewhere herein, the high molecular weight polyethylene component has a short chain branch content of about 1.0 to about 2.0 branches per 1,000 main chain carbons.

In one or more embodiments above or elsewhere herein, the ESCR of the composition is about 700 hours or more. In one or more embodiments above or elsewhere herein, the ESCR of the composition is about 800 hours or more. In one or more embodiments above or elsewhere herein, the ESCR of the composition is about 900 hours or more. In one or more embodiments above or elsewhere herein, the ESCR of the composition is at about 1,000 hours or more.

In one or more embodiments above or elsewhere herein, the percent die swell is about 60% or more. In one or more embodiments above or elsewhere herein, the percent die swell is about 65% or more. In one or more embodiments above or elsewhere herein, the percent die swell about 70% or more. In one or more embodiments above or elsewhere herein, the percent die swell is about 75% or more. In one or more embodiments above or elsewhere herein, the percent die swell is about 80% or more.

In one or more embodiments above or elsewhere herein, the low molecular weight polyethylene component has a molecular weight of about 100,000 or less. In one or more embodiments above or elsewhere herein, the low molecular weight polyethylene component has a molecular weight of about 50,000 or less. In one or more embodiments above or elsewhere herein, the low molecular weight polyethylene component has a molecular weight of about 45,000 or less. In one or more embodiments above or elsewhere herein, the low molecular weight polyethylene component has a molecular weight of about 40,000 or less.

An extruded bottle from the bimodal polyethylene composition is also provided. In at least one specific embodiment, the bottle includes a bimodal polyethylene composition having at least one high molecular weight polyethylene component having a molecular weight distribution (MWD) of about 6 to about 9 and a short chain branch content of less than about 2 branches per 1,000 main chain carbons. The bimodal polyethylene composition also includes at least one low molecular weight component. The high molecular weight polyethylene component is present in an amount of about 50 wt % or less of the composition. The composition has a density of about 0.94 g/cc or more; an ESCR of about 600 hours or more; and a percent die swell of about 70% or more. The bottle is blow molded to have a wall thickness of about 0.01 inches to about 0.03 inches and a weight of at least 70 grams.

In one or more embodiments above or elsewhere herein, the high molecular weight polyethylene component has a Mz+1 of about 2,000,000 or more.

In one or more embodiments above or elsewhere herein, the short chain branch content is about 1.0 to about 2.0 branches per 1,000 main chain carbons.

In one or more embodiments above or elsewhere herein, the high molecular weight polyethylene component has a comonomer content of about 0.3 mol % to about 1 mol %.

In one or more embodiments above or elsewhere herein, the low molecular weight polyethylene component has a molecular weight of about 100,000 or less. In one or more embodiments above or elsewhere herein, the low molecular weight polyethylene component has a molecular weight of about 50,000 or less. In one or more embodiments above or elsewhere herein, the low molecular weight polyethylene component has a molecular weight of about 45,000 or less. In one or more embodiments above or elsewhere herein, the low molecular weight polyethylene component has a molecular weight of about 40,000 or less.

In one or more embodiments above or elsewhere herein, the high molecular weight polyethylene component is present in an amount of about 60 wt % or less of the composition. In one or more embodiments above or elsewhere herein, the high molecular weight polyethylene component is present in an amount of about 50 wt % or less of the composition. In one or more embodiments above or elsewhere herein, the high molecular weight polyethylene component is present in an amount of about 40 wt % or less of the composition.

In one or more embodiments above or elsewhere herein, a ratio of weight average molecular weight of the high molecular weight polyethylene component to weight average molecular weight of the low molecular weight polyethylene component is about 20 or less. In one or more embodiments above or elsewhere herein, a ratio of weight average molecular weight of the high molecular weight polyethylene component to weight average molecular weight of the low molecular weight polyethylene component is about 19 or less. In one or more embodiments above or elsewhere herein, a ratio of weight average molecular weight of the high molecular weight polyethylene component to weight average molecular weight of the low molecular weight polyethylene component is about 18 or less. In one or more embodiments above or elsewhere herein, a ratio of weight average molecular weight of the high molecular weight polyethylene component to weight average molecular weight of the low molecular weight polyethylene component is about 17 or less. In one or more embodiments above or elsewhere herein, a ratio of weight average molecular weight of the high molecular weight polyethylene component to weight average molecular weight of the low molecular weight polyethylene component is about 16 or less. In one or more embodiments above or elsewhere herein, a ratio of weight average molecular weight of the high molecular weight polyethylene component to weight average molecular weight of the low molecular weight polyethylene component is about 15 or less.

In one or more embodiments above or elsewhere herein, the wall thickness is about 0.017 inches to about 0.026 inches.

In one or more embodiments above or elsewhere herein, the bottle weighs about 75 grams or more. In one or more embodiments above or elsewhere herein, the bottle weighs about 80 grams or more.

In one or more embodiments above or elsewhere herein, the ESCR of the composition is about 700 hours or more. In one or more embodiments above or elsewhere herein, the ESCR of the composition is about 800 hours or more. In one or more embodiments above or elsewhere herein, the ESCR of the composition is about 900 hours or more. In one or more embodiments above or elsewhere herein, the ESCR of the composition is at about 1,000 hours or more.

In one or more embodiments above or elsewhere herein, the percent die swell is about 60% or more. In one or more embodiments above or elsewhere herein, the percent die swell is about 65% or more. In one or more embodiments above or elsewhere herein, the percent die swell about 70% or more. In one or more embodiments above or elsewhere herein, the percent die swell is about 75% or more. In one or more embodiments above or elsewhere herein, the percent die swell is about 80% or more.

Polymerization Process

The polymerization process used to form any of the polymer components can be carried out using any suitable process. Illustrative processes include, but are not limited to, high pressure, solution, slurry and gas phase processes. Preferably, any one or more of the polyethylene components are polymerized by a continuous gas phase process utilizing a fluidized bed reactor. A fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380.

The reactor temperature of the fluid bed process herein preferably ranges from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

Hydrogen gas is often used in olefin polymerization to control the final properties of the polyolefin, such as described in Polypropylene Handbook 76-78 (Hanser Publishers, 1996). Using certain catalyst systems, increasing concentrations (partial pressures) of hydrogen can increase the melt flow rate (MFR) (also referred to herein as melt index (MI)) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propylene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range can include any combination of any upper mole ratio limit with any lower mole ratio limit described herein. Expressed another way, the amount of hydrogen in the reactor at any time may range to up to 5,000 ppm, and up to 4,000 ppm in another embodiment, and up to 3,000 ppm in yet another embodiment, and between 50 ppm and 5,000 ppm in yet another embodiment, and between 500 ppm and 2,000 ppm in another embodiment.

The one or more reactor pressures in a gas phase process (either single stage or two or more stages) may vary from 100 psig (690 kPa) to 500 psig (3448 kPa), and in the range from 200 psig (1379 kPa) to 400 psig (2759 kPa) in another embodiment, and in the range from 250 psig (1724 kPa) to 350 psig (2414 kPa) in yet another embodiment.

The gas phase reactor is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

Further, it is common to use a staged reactor employing two or more reactors in series, wherein one reactor may produce, for example, a high molecular weight component and another reactor may produce a low molecular weight component. In one or more embodiments, the polyolefin can be produced using a staged gas phase reactor. Such commercial polymerization systems are described in, for example, 2 Metallocene-Based Polyolefins 366-378 (John Scheirs & W. Kaminsky, eds. John Wiley & Sons, Ltd. 2000); U.S. Pat. Nos. 5,665,818, 5,677,375; 6,472,484; EP 0 517 868 and EP-A-0 794 200.

Process for Making The Bimodal Composition

Various different types of processes, and reactor configurations, can be used to produce the bimodal polyethylene composition, including melt blending, series reactors (i.e., sequentially-configured reactors) and single reactors using a mixed catalyst system. The bimodal composition, for example, can be a reactor blend (also sometimes referred to as a chemical blend). A reactor blend is a blend that is formed (polymerized) in a single reactor, e.g., using a mixed catalyst system. The bimodal composition can also be a physical blend, e.g., a composition formed by the post-polymerization blending or mixing together of two or more polymer components, i.e. at least one HMWC and at least one LMWC, where each of the polymer components is polymerized using the same or different catalyst systems.

Catalyst Systems

The term "catalyst system" includes at least one "catalyst component" and at least one "activator," alternately at least one cocatalyst. The catalyst system can also include other components, such as supports and/or co-catalysts, and is not limited to the catalyst component and/or activator alone or in combination. The catalyst system can include any number of catalyst components in any combination, as well as any activator in any combination.

The term "catalyst component" includes any compound that, once appropriately activated, is capable of catalyzing the polymerization or oligomerization of olefins. Preferably, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

The term "Group" as used herein refers to the "new" numbering scheme for the Periodic Table of Elements as described in the CRC HANDBOOK OF CHEMISTRY AND PHYSICS (David R. Lide ed., CRC Press 81$^{st}$ ed. 2000).

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Catalyst components include, but are not limited to, Ziegler-Natta catalysts, chromium-based catalysts, metallocene catalysts, Group 15-containing catalysts, and other single-site catalysts, and bimetallic catalysts. The catalyst or catalyst system can also include $AlCl_3$, cobalt, iron, palladium, chromium/chromium oxide or "Phillips" catalysts. Any catalyst can be used alone or in combination with the others.

Ziegler-Natta Catalysts

Illustrative Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973;5,525,678; 5,288,933; 5,290,745; 5,093,415 and 6,562,905. Examples of such catalysts include those having Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

In one or more embodiments, conventional-type transition metal catalysts can be used. Conventional type transition metal catalysts include traditional Ziegler-Natta catalysts in U.S. Pat. Nos. 4,115,639, 4,077,904, 4,482,687, 4,564,605, 4,721,763, 4,879,359 and 4,960,741. Conventional-type transition metal catalysts can be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Preferred conventional-type transition metal catalyst compounds include transition metal compounds from Groups 3 to 17, or Groups 4 to 12, or Groups 4 to 6. Preferably, M is titanium and the conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds can also be used with the above conventional-type transition metal catalyst compounds. Conventional-type cocatalyst compounds can be represented by the formula $M^3M^4_vX^2_cR^3_{b-c}$, wherein $M^3$ is a metal from Group 1 to 3 and 12 to 13; $M^4$ is a metal of Group 1; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Chromium Catalysts

Suitable chromium catalysts include di-substituted chromates, such as $CrO_2(OR)_2$; where R is triphenylsilane or a tertiary polyalicyclic alkyl. The chromium catalyst system can further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Illustrative chromium catalysts are further described in U.S. Pat. Nos. 3,709,853; 3,709,954; 3,231,550; 3,242,099; and 4,077,904.

Metallocenes

Metallocenes are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components."

The Cp ligands are one or more rings or ring system(s), at least a portion of which includes π-bonded systems, such as cycloalkadienyl ligands and heterocyclic analogues. The ring(s) or ring system(s) typically include atoms selected from Groups 13 to 16 atoms, or the atoms that make up the Cp ligands can be selected from carbon, nitrogen, oxygen, silicon, sulfur, phosphorous, germanium, boron and aluminum and combinations thereof, wherein carbon makes up at least 50% of the ring members. Or, the Cp ligand(s) can be selected from substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof.

Group 15-Containing Catalysts

The "Group 15-containing catalyst" can include Group 3 to Group 12 metal complexes, wherein the metal is 2 to 8 coordinate, the coordinating moiety or moieties include at least two Group 15 atoms, and up to four Group 15 atoms. In one embodiment, the Group 15-containing catalyst component can be a complex of a Group 4 metal and from one to four ligands such that the Group 4 metal is at least 2 coordinate and the coordinating moiety or moieties include at least two nitrogens. Representative Group 15-containing compounds are disclosed in, for example, WO 99/01460; EP A1 0 893 454; EP A1 0 894 005; U.S. Pat. Nos. 5,318,935; 5,889,128 6,333, 389 B2 and 6,271,325 B1. In one embodiment, the Group 15-containing catalyst can include Group 4 imino-phenol complexes, Group 4 bis(amide) complexes, and Group 4 pyridyl-amide complexes that are active towards olefin polymerization to any extent.

In one or more embodiments, a "mixed" catalyst system or "multi-catalyst" system is preferred. A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise. Any one or more of the different catalyst components can be supported or non-supported.

Activators

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes described. Illustrative Lewis acids include, but are not limited to, alumoxane (e.g., "MAO"), modified alumoxane (e.g., "TIBAO"), and alkylaluminum compounds. Ionizing activators (neutral or ionic) such as tri(n-butyl)ammonium tetrakis (pentafluorophenyl)boron may be also used. Further, a trisperfluorophenyl boron metalloid precursor may be used. Any of those activators/precursors can be used alone or in combination with the others.

MAO and other aluminum-based activators are known in the art. Ionizing activators are known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

End Uses

The bimodal composition can be used in a wide variety of products and end-use applications. The bimodal composition can be blended and/or coextruded with any other polymer. Non-limiting examples of other polymers include linear low density polyethylenes, elastomers, plastomers, high pressure low density polyethylene, high density polyethylenes, polypropylenes and the like.

The bimodal composition and blends thereof are useful in forming operations such as film, sheet, and fiber extrusion and co-extrusion as well as blow molding, injection molding and rotary molding. Films can include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers can include melt spinning, solution spinning and melt blown fiber operations for use in woven or non-woven form to make filters, diaper fabrics, medical garments, geotextiles, etc. Extruded articles can include medical tubing, wire and cable coatings, pipe, geomembranes, and pond liners. Molded articles can include single and multi-layered constructions in the form of bottles, tanks, large hollow articles, rigid food containers and toys, etc.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated. Molecular weights including weight average molecular weight ($M_w$), number average molecular weight ($M_n$), z-average molecular weight (Mz), and z+1-average molecular weight (Mz+1) were measured by Gel Permeation Chromatography (GPC), also known as size exclusion chromatography (SEC).

Examples 1-12

In each of examples 1-12, bimodal high density polyethylene compositions were prepared by physically blending various amounts of a first polyethylene component or high molecular weight polyethylene component ("HMWC") with a second polyethylene component or low molecular weight polyethylene component ("LMWC"). The HMWC was polymerized using a gas phase reactor system with a spray-dried catalyst system. The catalyst system included (phenylmethyl) [N'-(2,3,4,5,6-pentamethylphenyl)-N-[2-[(2,3,4,5,6-pentamethylphenyl)amino-kN}ethyl]-1,2-ethane diamino(2-) kN,kN']zirconium. The catalyst was activated using MMAO, a modified methylalumoxane. A "dry mode" was utilized, meaning that the material was introduced to the reactor in the form of dry powder (granules). Reactor conditions were as follows:

ethylene partial pressure=220 psi;
temperature=85° C.;
H2/C2=0.0035;
C6/C2=0.005;
bed weight=115 lbs.;

fluidized bulk density=13 lb/ft³ to 19 lb/ft³;
SGV=2 ft/s to 2.15 ft/s;
dew point=55° C. to 60° C.; and
isopentane concentration=10% to 12%.

The LMWC was polymerized using gas phase polymerization in the presence of a spray-dried catalyst system. The catalyst system included a supported Ziegler-Natta catalyst (dibutyl magnesium/Butyl alcohol/TiCl₄/SiO₂). The catalyst system was also activated using MMAO, and a "dry mode" was used. Reactor conditions were as follows:
ethylene partial pressure=220 psi;
temperature=85° C.;
H2/C2=0.0035;
C6/C2=0.005;
bed weight=115 lbs.;
fluidized bulk density=13 lb/ft³ to 19 lb/ft³;
SGV=2 ft/s to 2.15 ft/s;
dew point=55° C. to 60° C.; and
isopentane concentration=10% to 12%.

Comparative Examples 13-15

In the comparative examples 13-15, the LMWC was prepared as in Examples 1-12, but the HMWC was polymerized in a gas phase reactor in the presence of a metallocene catalyst. Particularly, the catalyst system was bis(n-propylcyclopentadienyl) zirconium dichloride. Also fed to the reactor was MMAO, and a "dry mode" was also used. Reactor conditions for these products were as follows:
ethylene partial pressure=220 psi;
temperature=85° C.;
H2/C2=0.0035;
C6/C2=0.005;
bed weight=115 lbs.;
fluidized bulk density=13 lb/ft³ to 19 lb/ft³;
SGV=2 ft/s to 2.15 ft/s;
dew point=55° C. to 60° C.; and
isopentane concentration=10% to 12%.

In each of the Examples 1-12 and Comparative Examples 13-15, granules of the HMWC and LMWC were dry blended with Irganox 1010 (1,000 ppm); and Irgafos 168 (1,000 ppm); and compounded using a Prodex single screw extruder with two mixing heads to form the bimodal high density polyethylene compositions. Resin properties and Size Exclusion Chromatography (SEC) data of the bimodal polyethylene compositions are shown in Table 1.

The environmental stress cracking resistance (ESCR) of the polyethylene compositions was also tested. The ESCR test was performed in accordance with ASTM D 1693 Procedure B, F50 hours. The specific plate dimensions were 38 mm×13 mm. The plates had a thickness of 1.90 mm. Table 1 shows the environmental stress cracking resistance (ESCR) of the polyethylene compositions.

Bottles from the polyethylene compositions were blow molded using an Impco blow molding machine model A12. The compositions were extruded at 190° C. through a 1.625" diameter divergent die and blow molded to form a ½ gallon bottle. The time (t) in seconds to extrude a parison was 2.0. Each bottle had a wall thickness between about 0.01 inches and about 0.03 inches.

The percent die swell (% DS) of the polyethylene compositions was also calculated. The compositions were extruded at 190° C. and a shear rate of 997.2 s⁻¹. The polymer was passed at a constant rate through a capillary die 20 mm in length and 1 mm in diameter. The time (t) in seconds to extrude a rod 15.24 cm in length was measured. The percent die swell is defined by $\{D/D_o-1\}\times 100$, where $D_o$ is the diameter of the die (1 mm) and D is the average diameter of the extruded rod calculated as follows:

$$D=20*[t*0.075/(15.24*\pi*0.7693)]^{0.5}$$

The percent die swell (% DS) of the polyethylene compositions are reported in Table 1 below.

The amount of short chain branches of the high molecular weight components was also measured. Samples of the HMWC were prepared by adding approximately 3 mL of a 50/50 mixture of tetrachloroethane-d2/orthodichlorobenzene (0.025M in chromium acetylacetonate (relaxation agent)) to a 0.4 g of a HMWC in a 10 mm NMR tube. The sample was dissolved and homogenized by heating the tube and its contents to 150° C. The data was collected using a Varian UNITY Inova 400 MHz NMR spectrometer, corresponding to a 13C resonance frequency of 100.4 MHz. Acquisition parameters were selected to ensure quantitative $^{13}C$ data acquisition in the presence of the relaxation agent. The data was acquired using gated $^1H$ decoupling, 4000 transients per data file, a 7 sec pulse repetition delay, spectral width of 24,200 Hz and a file size of 64K data points, with the probe head heated to 110° C.

Comparative Example 16

A comparative polyethylene composition was polymerized in a gas phase reactor in the presence of a chromium based catalyst. The composition had a density of 0.9530 g/cc; FI ($I_{21}$) of 33 g/10 min; MI ($I_2$) of 0.39 g/10 min; and MFR ($I_{21}/I_2$) of 85. The Mn was 13,699; Mw was 125,648, and the MWD was 9.17. The composition measured an ESCR of 24-48 hours. The bottle produced from this composition weighed 73 gram bottle, and the composition had a die swell of about 73%.

TABLE 1

Properties and Size Exclusion Chromatography (SEC) data of the bimodal compositions.

| Example: | 1 | 2 | 3 | 4 | 5 | 6 | 7 | 8 |
|---|---|---|---|---|---|---|---|---|
| HMWC wt % | 40 | 60 | 40 | 40 | 60 | 40 | 40 | 50 |
| LMWC wt % | 60 | 40 | 60 | 60 | 40 | 60 | 60 | 50 |
| HMWC FI ($I_{21}$), g/10 min. | 0.4 | 0.4 | 0.4 | 0.4 | 0.4 | .04 | 1.0 | 1.0 |
| LMWC MI ($I_2$), g/10 min. | 56 | 56 | 94 | 184 | 184 | 94 | 56 | 56 |

TABLE 1-continued

Properties and Size Exclusion Chromatography (SEC) data of the bimodal compositions.

| | | | | | | | | |
|---|---|---|---|---|---|---|---|---|
| HMWC Density (g/cc): | 0.933 | 0.933 | 0.933 | 0.933 | 0.933 | 0.933 | 0.935 | 0.935 |
| LMWC Density (g/cc): | 0.964 | 0.964 | 0.967 | 0.968 | 0.968 | 0.967 | 0.964 | 0.964 |
| Blend Density (g/cc) | 0.954 | 0.948 | 0.956 | 0.957 | 0.950 | 0.9548 | 0.955 | 0.952 |
| Blend FI ($I_{21}$), g/10 min. | 25.3 | 5.1 | 31.3 | 40.7 | 6.0 | 32.5 | 46.9 | 20.0 |
| Blend MI ($I_2$), g/10 min. | 0.29 | 0.07 | 0.28 | 0.34 | 0.67 | 0.29 | 0.69 | 0.3 |
| Blend MFR ($I_{21}/I_2$) | 88 | 74 | 113 | 119 | 89 | 80.8 | 68 | 67 |
| Blend Mn: | 16,213 | 21,881 | 11,052 | 10,361 | 15,173 | 13,071 | 14,776 | 17,187 |
| Blend Mw: | 213,261 | 268,485 | 223,129 | 194,071 | 268,419 | 204,041 | 151,389 | 187,896 |
| Blend Mw/Mn: | 13.15 | 12.27 | 20.19 | 18.73 | 17.69 | 15.61 | 10.25 | 10.93 |
| LMWC Mn: | 10,300 | 10,300 | 9,000 | 7,300 | 7,300 | 9,000 | 10,300 | 10,300 |
| LMWC Mw: | 40,100 | 40,100 | 33,500 | 28,900 | 28,900 | 33,500 | 40,100 | 40,100 |
| LMWC Mw/Mn: | 3.9 | 3.9 | 3.7 | 3.96 | 3.96 | 3.7 | 3.9 | 3.9 |
| HMWC Mn: | 61,034 | 61,034 | 61,034 | 61,034 | 61,034 | 61,034 | 56,852 | 56,852 |
| HMWC Mw: | 498,437 | 498,437 | 498,437 | 498,437 | 498,437 | 498,437 | 376,735 | 376,735 |
| HMWC Mw/Mn: | 8.17 | 8.17 | 8.17 | 8.17 | 8.17 | 8.17 | 6.63 | 6.63 |
| HMWC SCB: | 1.9 | 1.9 | 1.9 | 1.9 | 1.9 | 1.9 | 2.0 | 2.0 |
| HMWC Mw: LMWC Mw | 12.4 | 12.4 | 14.9 | 17.2 | 17.2 | 14.9 | 9.4 | 9.4 |
| Mz | 1,788,925 | 1,788,925 | 1,788,925 | 1,788,925 | 1,788,925 | 1,788,925 | 1,384,746 | 1,384,746 |
| Mz + 1 | 3,495,538 | 3,495,538 | 3,495,538 | 3,495,538 | 3,495,538 | 3,495,538 | 2,767,567 | 2,767,567 |
| ESCR, hours | >1000 | >1000 | 745 | 790 | >1000 | 634 | 192 | 804 |
| Percent Die Swell, % | 83.5 | 49.0 | 58.9 | 63.7 | 53.1 | 59.4 | 75.2 | 81.9 |
| Bottle Weight, gm | 82.8 | 58.7 | 71.7 | 71.9 | 58.6 | 69.8 | 81.2 | 73.7 |

| Example: | 9 | 10 | 11 | 12 | Comp. 13 | Comp. 14 | Comp. 15 |
|---|---|---|---|---|---|---|---|
| HMWC wt % | 40 | 60 | 50 | 50 | 40 | 40 | 50 |
| LMWC wt % | 60 | 40 | 50 | 50 | 60 | 60 | 50 |
| HMWC FI ($I_{21}$), g/10 min. | 1.0 | 1.0 | 1.1 | 1.1 | 0.7 | 0.7 | 0.7 |
| LMWC MI ($I_2$), g/10 min. | 184 | 184 | 56 | 184 | 56 | 94 | 56 |
| HMWC Density (g/cc): | 0.935 | 0.935 | 0.935 | 0.935 | 0.937 | 0.937 | 0.937 |
| LMWC Density (g/cc): | 0.968 | 0.968 | 0.964 | 0.968 | 0.964 | 0.967 | 0.964 |
| Blend Density (g/cc) | 0.958 | 0.951 | 0.9509 | 0.9539 | 0.9564 | 0.9571 | 0.9536 |
| Blend FI ($I_{21}$), g/10 min. | 81.7 | 13.0 | 20.5 | 29.9 | 32.1 | 39 | 15.2 |
| Blend MI ($I_2$), g/10 min. | 1.00 | 0.18 | 0.285 | 0.355 | 0.415 | 0.446 | 0.188 |
| Blend MFR ($I_{21}/I_2$) | 82 | 73 | 72 | 84 | 112 | 77 | 87 |
| Blend Mn: | 10,438 | 13,095 | 17,867 | 13,115 | 12,738 | 12,527 | 23,511 |
| Blend Mw: | 147,574 | 211,648 | 190,843 | 186,829 | 169,552 | 172,525 | 211,521 |
| Blend Mw/Mn: | 14.14 | 16.16 | 10.68 | 14.25 | 13.31 | 13.77 | 9.00 |
| LMWC Mn: | 7,300 | 7,300 | 10,300 | 7,300 | 10,300 | 9,000 | 10,300 |
| LMWC Mw: | 28,900 | 28,900 | 40,100 | 28,900 | 40,100 | 33,500 | 40,100 |

TABLE 1-continued

Properties and Size Exclusion Chromatography (SEC) data of the bimodal compositions.

| | | | | | | | |
|---|---|---|---|---|---|---|---|
| LMWC Mw/Mn: | 3.96 | 3.96 | 3.9 | 3.96 | 3.9 | 3.7 | 3.9 |
| HMWC Mn: | 56,852 | 56,852 | 49,706 | 49,706 | 81,443 | 81,443 | 81,443 |
| HMWC Mw: | 376,735 | 376,735 | 357,525 | 357,525 | 384,051 | 384,051 | 384,051 |
| HMWC Mw/Mn: | 6.63 | 6.63 | 7.19 | 7.19 | 4.72 | 4.72 | 4.72 |
| HMWC SCB: | 2.0 | 2.0 | N/A | N/A | N/A | N/A | N/A |
| HMWC Mw LMWC Mw | 13.0 | 13.0 | 12.4 | 12.4 | 9.6 | 11.5 | 9.6 |
| Mz | 1,384,746 | 1,384,746 | 1,451,411 | 1,451,411 | 1,096,917 | 1,096,917 | 1,096,917 |
| Mz + 1 | 2,767,567 | 2,767,567 | 3,106,775 | 3,106,775 | 1,930,380 | 1,930,380 | 1,930,380 |
| ESCR, hours | 223 | >1000 | 896 | 675 | 97 | 133 | 212 |
| Percent Die Swell, % | 75.9 | 75.7 | 82.0 | 63.9 | 69.1 | 63.3 | 74.9 |
| Bottle Weight, gm | 78.9 | 66.2 | 73.0 | 68.4 | 71.5 | 71.3 | 66.7 |

As shown in Table 1, Examples 1-12 provided compositions with surprising and unexpected ESCR values in combination with excellent die swell percentages. Particularly worth noting, Examples 1 and 10 provided compositions having an ESCR greater than 1,000 hours and a die swell over 75%. Example 1 also provided a bottle weight of about 83 grams. Also notable are Examples 8 and 11 which provided compositions having ESCR values greater than 800 hours, die swells above 80% and bottle weights above 80 grams. Conversely, none of the comparative examples provided a composition having an ESCR of more than 212 hours. The best die swell of 74.9% (Comparative Example 15) had a bottle weight of only 66.7 grams.

For purposes of convenience, various specific test procedures have been identified for determining properties such as average molecular weight, molecular weight distribution (MWD), flow index (FI), melt index (MI), melt flow ratio (MFR), and density. However, when a person of ordinary skill reads this patent and wishes to determine whether a composition or polymer has a particular property identified in a claim, then any published or well-recognized method or test procedure can be followed to determine that property (although the specifically identified procedure is preferred, and that any procedure specified in a claim is mandatory, not merely preferred). Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

Various terms used herein have been defined above. To the extent a term used in a claim is not defined above, or elsewhere herein, it should be given the broadest definition persons in the pertinent art have given that term as reflected in one or more printed publications or issued patents. Furthermore, all priority documents are herein fully incorporated by reference for all jurisdictions in which such incorporation is permitted. All documents cited herein, including testing procedures, are also herein fully incorporated by reference for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A bimodal polyethylene composition, comprising:
   at least one high molecular weight polyethylene component having a molecular weight distribution (MWD) of about 6 to about 9, a short chain branch content of less than about 2 branches per 1,000 main chain carbons, and a Mz of about 1,100,000 or more, wherein the high molecular weight polyethylene component is present in an amount of about 50 wt % or less of the bimodal polyethylene composition; and
   at least one low molecular weight polyethylene component, wherein:
   a ratio of weight average molecular weight of the high molecular weight polyethylene component to weight average molecular weight of the low molecular weight polyethylene component is about 20 or less; and
   the composition has a density of about 0.94 g/cc or more, an ESCR of about 600 hours or more, and a percent die swell of about 70% or more.

2. The composition of claim 1, wherein the high molecular weight polyethylene component has a Mz+1 of about 2,000,000 or more.

3. The composition of claim 1, wherein the high molecular weight polyethylene component has a comonomer content of about 0.3 mol % to about 1 mol %.

4. The composition of claim 1, wherein the composition has a density of about 0.96 g/cc or more.

5. The composition of claim 1, wherein the ratio of weight average molecular weight of the high molecular weight polyethylene component to weight average molecular weight of the low molecular weight polyethylene component is about 15 or less.

6. A bimodal polyethylene composition, comprising:

at least one high molecular weight polyethylene component having a molecular weight distribution (MWD) of about 6 to about 9, a Mz of about 1,100,000 or more, and a Mz+1 of about 2,000,000 or more, wherein the high molecular weight polyethylene component is present in an amount of about 50 wt % or less of the bimodal polyethylene composition; and at least one low molecular weight polyethylene component having a molecular weight of about 50,000 or less, wherein:

the composition has a density of about 0.94 g/cc or more, an ESCR of about 600 hours or more, and a percent die swell of about 70% or more.

7. The composition of claim 6, wherein the high molecular weight polyethylene component has a short chain branch content or about 1.0 to about 2.0 branches per 1,000 main chain carbons.

8. The composition of claim 6, wherein the high molecular weight polyethylene component has a short chain branch content of less than about 2 branches per 1,000 main chain carbons.

9. The composition of claim 6, wherein the high molecular weight polyethylene component has a comonomer content of about 0.3 mol % to about 1 mol %.

10. The composition of claim 6, wherein a ratio of weight average molecular weight of the high molecular weight polyethylene component to weight average molecular weight of the low molecular weight polyethylene component is about 20 or less.

11. The composition of claim 6, wherein a ratio of weight average molecular weight of the high molecular weight polyethylene component to weight average molecular weight of the low molecular weight polyethylene component is about 15 or less.

12. An extruded bottle comprising:

a bimodal polyethylene composition having at least one high molecular weight polyethylene component having a molecular weight distribution (MWD) of about 6 to about 9 and a short chain branch content of less than about 2 branches per 1,000 main chain carbons, wherein:

the high molecular weight polyethylene component is present in an amount of about 50 wt % or less of the composition; and the composition has a density of about 0.94 g/cc or more; an ESCR of about 600 hours or more; and a percent die swell of about 70% or more; and the bottle is blow molded to have a wall thickness of about 0.01 inches to about 0.03 inches and a weight of at least 70 grams.

13. The bottle of claim 12, wherein the high molecular weight polyethylene component has a Mz+1 of about 2,000,000 or more.

14. The bottle of claim 12, wherein the short chain branch content is about 1.0 to about 2.0 branches per 1,000 main chain carbons.

15. The bottle of claim 12, wherein the high molecular weight polyethylene component has a comonomer content of about 0.3 mol % to about 1 mol %.

16. The bottle of claim 12, further comprising at least one low molecular weight polyethylene component having a molecular weight of about 50,000 or less.

17. The bottle of claim 12, wherein a ratio of weight average molecular weight of the high molecular weight polyethylene component to weight average molecular weight of the low molecular weight polyethylene component is about 20 or less.

18. The bottle of claim 12, wherein the wall thickness is about 0.017 inches to about 0.026 inches and the bottle weighs at least 75 grams.

* * * * *